United States Patent [19]

Tanii

[11] Patent Number: 5,110,466
[45] Date of Patent: May 5, 1992

[54] FILTER PRESS

[76] Inventor: Kiyoshi Tanii, 1349, Arao, Arao-shi, Kumamoto-ken, Japan

[21] Appl. No.: 629,559

[22] Filed: Dec. 18, 1990

[30] Foreign Application Priority Data

Jan. 8, 1990 [JP] Japan .................................. 2-754[U]
Feb. 24, 1990 [JP] Japan .................................. 2-44191

[51] Int. Cl.$^5$ ............................................. B01D 25/32
[52] U.S. Cl. ................................... 210/225; 100/198
[58] Field of Search ......................... 210/225; 100/198

[56] References Cited

U.S. PATENT DOCUMENTS 4,325,396  4/1982  Gehrmann .......................... 210/225
4,659,465  4/1987  Makinoda ........................... 210/225
5,006,241  4/1991  Davis ................................. 210/225

Primary Examiner—W. Gary Jones
Assistant Examiner—Matthew O. Savage
Attorney, Agent, or Firm—Wood, Phillips, Van Santen, Hoffman & Ertel

[57] ABSTRACT

Disclosed is a filter press for removing water from sludge, which is generated when washing a concrete mixer truck or the like and which contains cement and sand, by means of a number of filter plates, which are arranged on edge and facing each other. Sludge is passed under pressure through the inside of each filter plate, thereby filtering out the water contained therein. The filter press comprises a horizontal track arranged above the filter plates and a carriage adapted to travel upon this horizontal track. The carriage is equipped with a vertical operation cylinder. Provided in the lower section of the vertical operation cylinder are a separating rod for separating adjacent filter plates from each other and nozzles for injecting water under pressure for washing the outer periphery of each filter plate. The carriage is further equipped with a reverse-washing operation cylinder, to the lower end of which is connected a reverse-washing water-supply pipe for supplying water under pressure into each filter plate.

9 Claims, 8 Drawing Sheets

FILTER PRESS

BACKGROUND OF THE INVENTION

This invention relates to a filter press, which is used to remove water from sludge so as to recover cake thereby obtained. Readymixed concrete to be used in a construction site is prepared through mixing in a concrete mixer truck. After it has been used, some of the readymixed concrete usually remains in the concrete mixer truck and is brought back to where the trucks are washed. Sludge is produced when separating this remaining readymade concrete into aggregate and sand, or when washing the concrete mixer truck with water. The water contained in the sludge thus produced is removed therefrom through filtration, thereby obtaining cake, which consists of cement and very fine sand. A filter press, which is used for obtaining cake from sludge through filtration, employs a number of filter plates, arranged an edge and facing each other, for the purpose of filtering out water contained in the sludge, the cake remaining on the surfaces of the filter plates. This process involves the operations of peeling the cake from the surfaces of the filter plates and, after the peeling, washing the filter cloth provided thereon with water. In view of this, a filter press requires a mechanism for separating two adjacent filter plates from each other in order to remove cake from their surfaces as well as a mechanism for washing the surface of each filter plate with water after the peeling.

The inventor of the present invention proposed a filter press structure (Japanese Patent Application No. 64-75010), according to which a number of filter plates are lodged in a frame in an arrangement in which they are set on edge and face each other. In this structure, a stationary plate is provided at one end of the frame, and a movable plate at the other end, the filter plates being set between these two plates. Provided above this frame is a horizontal track, upon which a carriage can travel. The carriage is equipped with a vertical operation cylinder, which is set in an upright position. Provided in the lower section of this vertical operation cylinder are a separating operation cylinder, which is adapted to make a telescopic movement, and a water-flow pipe, which is rotatably supported by the lower section of the vertical operation cylinder. The telescopic movement of the separating operation cylinder causes a separating rod to rotate around the axis of the water-flow pipe, thereby separating two adjacent filter plates from each other. As a result, the cake accumulated on the surfaces of these filter plates falls off. At the same time, compressed air is supplied into the above-mentioned vertical operation cylinder so as to cause it to make a telescopic movement in the vertical direction, thereby causing the above-mentioned water-flow pipe to move in the vertical direction along with the nozzles communicating with it. During this vertical movement, water is sprayed from the nozzles, thereby washing the filter cloth on the filter plates from the outside.

A problem in this filter press structure is that the filter plates are washed only from the outside, which means high-water under pressure has to be applied to them repeatedly before they can be washed clean enough to provide a high level of dewatering efficiency. As a result, the filter cloth on the filter plates do not have a long service life. In addition, this structure necessitates a very large amount of water for washing.

There is a conventional filter-cloth washing device in which the filter plates are washed solely from within. Hereafter, this mode of washing will be referred to as "reverse washing". In this device, the inlet and outlet for washing water in each filter plate have to be connected to parent water-supply and discharge pipes through flexible tubes, and water under pressure has to be supplied maintaining a certain level of uniform pressure for each filter plate. Furthermore, the mechanism for supplying water under pressure is totally unrelated to the mechanism for separating adjacent filter plates from each other in terms of its operation. As a result, a filter press equipped with both mechanisms must inevitably have a very complicated structure.

SUMMARY OF THE INVENTION

It is accordingly an object of this invention to provide a filter press in which a vertical operation cylinder relates the operations of the following two mechanisms to each other: the mechanism for successively performing the operation of separating adjacent filter plates from each other, starting from those filter plates at one end of a horizontal row of filter plates, for the purpose of allowing the cake accumulated on the surfaces of the filter plates to fall off by the force of gravity, and the mechanism for washing both from within and outside the filter cloth, which constitutes the surfaces of the filter plates. The operations of these two mechanisms are performed by using a part of the same vertical operation cylinder, thus simplifying the overall structure of the filter press. Another object of this invention is to provide a filter press which uses less water for washing and in which the pressure of the washing water is lower than that in the prior art, thereby avoiding damage to the filter cloth to some degree.

Still another object of this invention is to provide a filter press which can wash the filter cloth reliably so as to prevent it from being clogged, thereby enhancing the efficiency in the operation of dewatering sludge.

In accordance with this invention, there is provided a filter press comprising: a frame for lodging a number of filter plates in an arrangement in which they are set on edge and face each other; a stationary plate provided at one end of the frame; a pressure plate slidably arranged at the other end of the frame; a horizontal track provided above the frame; a carriage which can travel upon the horizontal track; a vertical operation cylinder attached to the track and having an operating rod adapted to make a telescopic movement in the vertical direction; a water-flow pipe which communicates with nozzles for washing from the outside and which is rotatably supported by the operating rod of the vertical operation cylinder; a separating operation cylinder which is provided in the lower section of the vertical operation cylinder and which is adapted to make a telescopic movement; a separating rod which is adapted to be rotated around the axis of the water-flow pipe by the telescopic movement of the separating operation cylinder, thereby separating two of the filter plates from each other so as to make the cake accumulated on the surfaces of the filter plates fall off, and, at the same time, causing the nozzles to move vertically while washing the filter cloth on the surfaces of the filter plates from the outside; a reverse-washing operation cylinder the upper section of which is connected to the carrier; a reverse-washing water-supply pipe which is connected to the lower end section of the reverse-washing operation cylinder; connection pipes which are protruding from the reverse-washing water-supply pipe in such a manner as to respectively face corresponding connection pipes provided on each of the filter plates; a downwardly directed photosensor which is attached to the lower section of the carrier; the tip of the photosensor facing the locus of movement of the handle of each filter plate, and the output terminal of this photosensor being connected to the respective input terminals provided in a carriage driving device, the vertical operation cylinder, the separating operation cylinder, and the reverse-washing operation cylinder.

DETAILED DESCRIPTION OF THE PREFERRED EMBODIMENT

Figure 1:
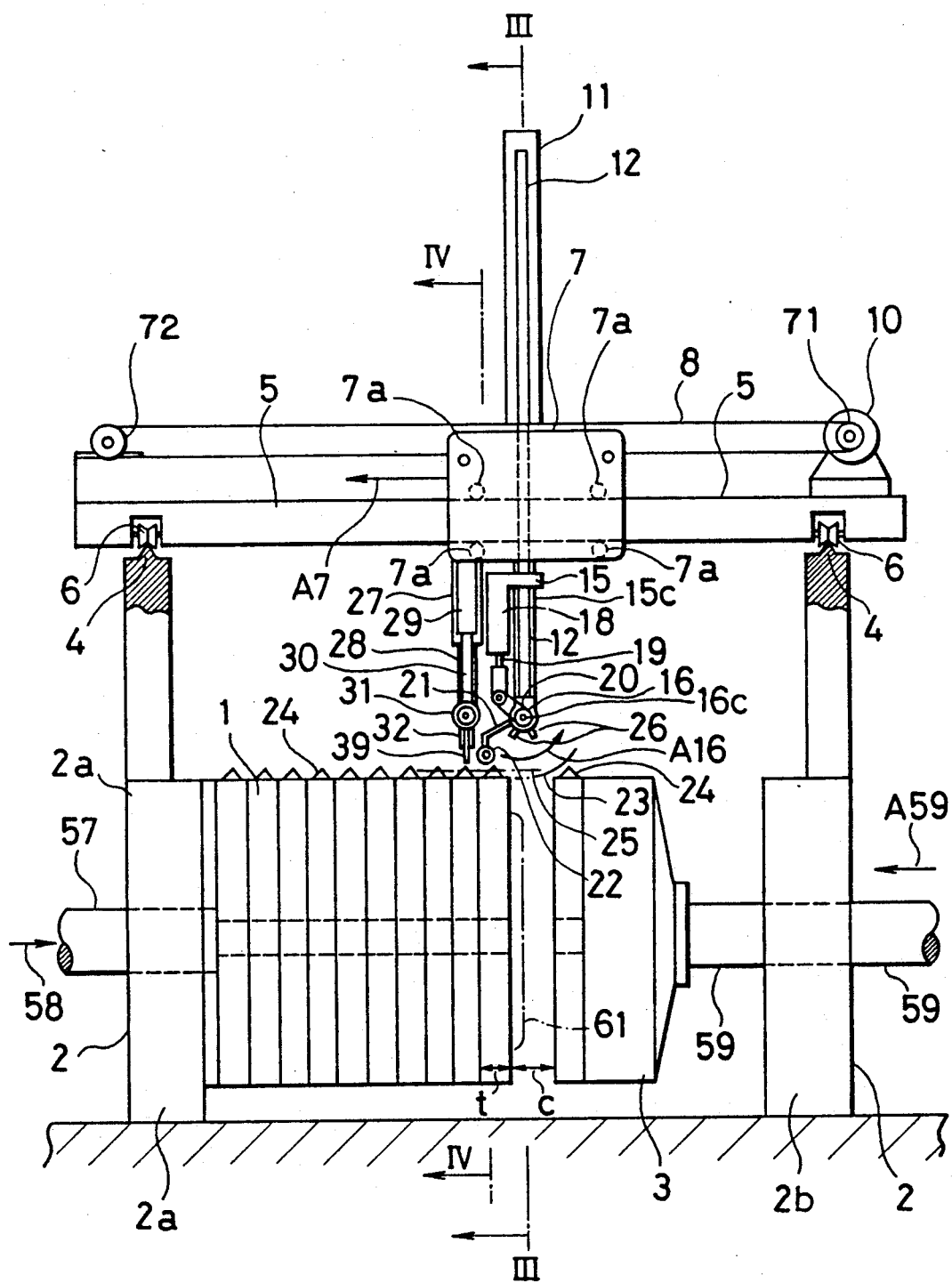
FIG. 1 is a front view showing the mechanism for separating filter plates from each other and the mechanism for washing filter cloth provided in a filter press in accordance with an embodiment of this invention.

As shown in FIGS. 1 to 4, the filter press of this invention includes a frame 2 for lodging a number of filter plates 1, in an arrangement in which they are set on edge and face each other. A pressure plate 3 is provided at one end of the frame 2 in such a manner as to be movable in the horizontal direction. Provided on top of the frame 2 are a pair of horizontal crossing rails 4, which extend perpendicular to the direction in which the filter plates 1 are arranged. Provided on top of the horizontal crossing rails 4 is a horizontal track 5, which extends parallel to the direction in which the filter plates 1 are arranged. The horizontal track 5 engages the horizontal crossing rails 4 through the intermediation of rollers 6, which allow the horizontal track 5 to move in the direction crossing the direction in which the filter plates 1 are arranged. Provided on the horizontal track 5 is a carriage 7, which is equipped with rollers 7a, so that it can travel upon this horizontal track 5. Further provided on the track 5 are an electric motor 10, a pair of drive wheels 71, a pair of driven wheels 72, and a pair of chains 8. Each of the chains 8 is wound around each of the drive and driven wheels 71 and 72. The carriage 7 is connected to a part of each chain 8. Thus, the rotation of the electric motor 10 causes the chains 8 to run in the horizontal direction, thereby causing the carriage 7 to travel upon the horizontal track 5.

Figure 3:
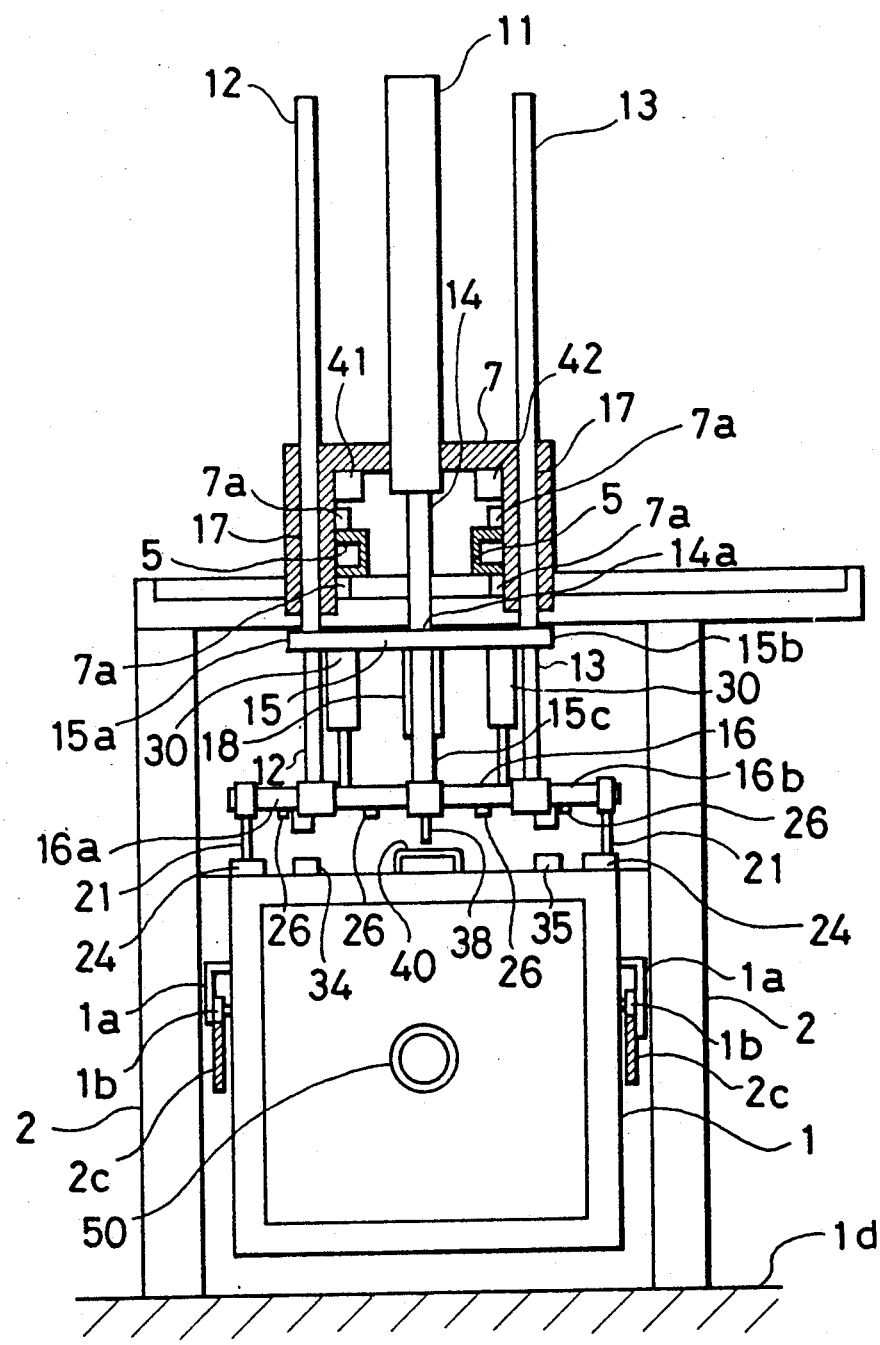
FIG. 3 is a sectional view taken along the line III—III of FIG. 1.

As shown in FIG. 3, the bottom end section of a vertical operation cylinder 11 is attached to the center of the carriage 7, and, at the same time, vertical guide rods 12 and 13, provided respectively on each side of the vertical operation cylinder 11, are slidably engaged with the carriage 7. The lower end 14a of a vertically movable operation rod 14, which is adapted to move vertically in the vertical operation cylinder 11, is connected to the middle section of a horizontal drive rod 15. Further, a link rod 15c extends vertically downwards from the middle section of the drive rod 15, and the middle portion of a water-flow pipe 16 is rotatably connected to the lower end of the link rod 15c.

The respective lower ends of the vertical guide rods 12 and 13 slidably engage the end portions 15a and 15b of the above-mentioned drive rod 15. Rotatably connected to the respective lower ends of the vertical guide rods 12 and 13 are the end sections 16a and 16b of the above-mentioned water-flow pipe 16. By supplying compressed air into the vertical operation cylinder 11, the operation rod 14, which is provided therein, is caused to make a telescopic movement in the vertical direction. As a result, the water-flow pipe 16, which is rotatably supported by the drive rod 15 at the lower end of the operation rod 14 through the intermediation of the above-mentioned connecting rod 15c, moves in the vertical direction along with the guide rods 12 and 13, which are respectively connected to the respective end sections 16a and 16b of the water-flow pipe 16.

During this movement, the guide rods 12 and 13 slide correctly through guide holes 17 formed in the carriage 7, thereby preventing the operation rod 14, which is connected to these guide rods 12 and 13, from being inclined as it moves in the vertical direction.

As shown in FIG. 1, connected to the above-mentioned drive rod 15 is the upper end of a separating operation cylinder 18 having a link 19. One end section of a rotating rod 20 is rotatably connected to the lower end of the link 19 of the separating operation cylinder 18, and the other end section of the same is fixed to the outer periphery of the above-mentioned water-flow pipe 16. By supplying compressed air into the separating operation cylinder 18, the rotating rod 20 and the water-flow pipe 16 connected thereto are caused to swing around the axis 16c of the water-flow pipe 16 in the direction indicated by the arrow A16.

Apart from this, the respective base end sections of separating rods 21 are connected to the end sections of the above-mentioned water-flow pipe 16. The locus of rotation of the tip 22 of each separating rod 21 is made to cross the locus of movement 25 of the pointed engagement section 24 of each of the above-mentioned filter plates 1. The tip 22 of each separating rod 21 swings in synchronism with the swinging of the above-mentioned rotating rod 20, thereby causing each filter plate 1 to be displaced a predetermined distance C.

Further, protruding from the water-flow pipe 16 are a plurality of nozzles 26, which are directed to the surface of the above-mentioned filter plate 1 so as to spray on it water under pressure, which is supplied into the water-flow pipe 16.

Figure 4:
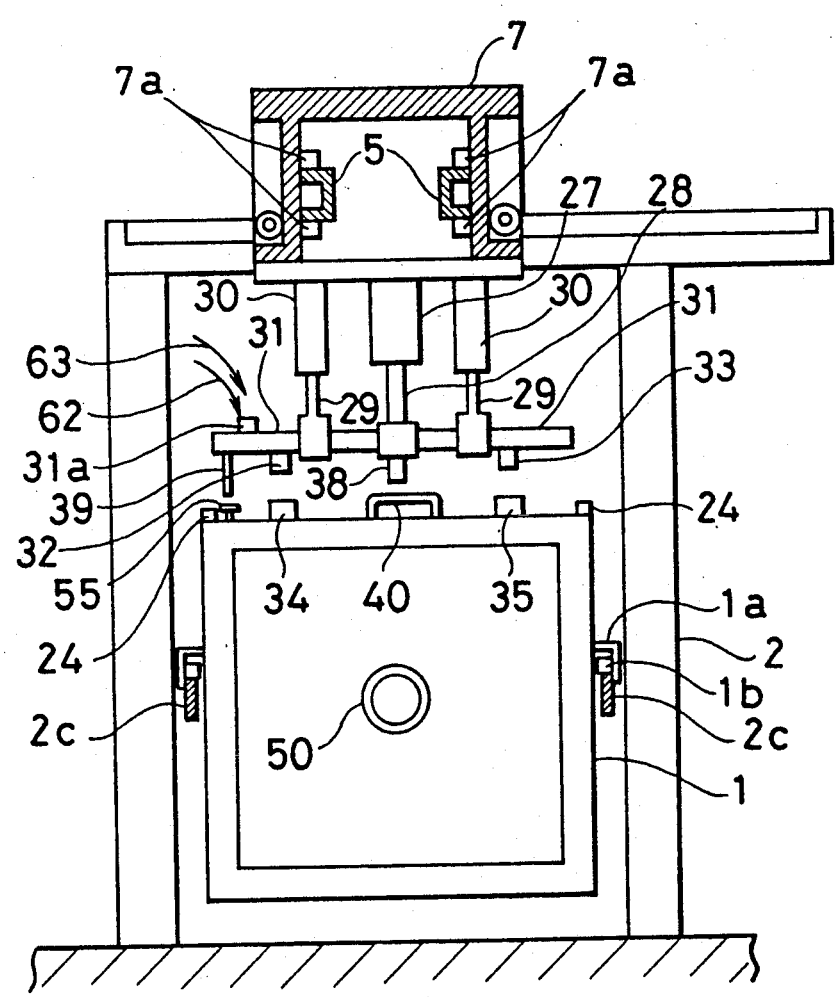
FIG. 4 is a sectional view taken along the line IV—IV of FIG. 1.

Further, as shown in FIG. 4, connected to the above-mentioned carriage 7 is the upper end section of a reverse-washing operation cylinder 27, which has a link rod 28. Connected to the lower end of the link rod 28 is the middle portion of a reverse-washing water-supply pipe 31. Protruding downwards from this reverse-washing water-supply pipe 31 are connection pipes 32 and 33 for selectively supplying air under pressure 63 and water under pressure 62 to each filter plate 1. These connection pipes 32 and 33 are arranged such that they respectively face corresponding connection pipes 34 and 35 provided on each filter plate 1. By supplying compressed air into the reverse-washing operation cylinder 27, the connection pipes 32 and 33, which are formed on the lower peripheral surface of the reverse-washing water-supply pipe 31 at the lower end of the link rod 28 of the operation cylinder 27, are joined with or separated from the respective connection pipes 34 and 35, which are provided on the filter plate 1.

Reverse-washing guide rods 29 are provided respectively on each side of the reverse-washing water-supply pipe 31, and the respective upper sections of these reverse-washing guide rods 29 slidably engage respective guide cylinders 30, thereby allowing the above-mentioned reverse-washing water-supply pipe 31 to move correctly in the vertical direction.

Further, a photosensor 38 and a pressure rod 39, both directed downwards, are protruding from the reverse-washing water-supply pipe 31. The tip of the photosensor 38 faces the locus of movement of the handle 40 of the filter plate 1. When the handle 40 of the filter plate 1 does not exist below the photosensor 38, an output from this photosensor 38 causes the above-mentioned electric motor 10 to be driven, thereby rotating the drive wheels 71. As a result, the carriage 7 is caused, through the intermediation of the chains 8, to start moving upon the horizontal track 5. When, afterwards, the tip of the photosensor 38 comes to face the handle 40 of the filter plate 1, the rotation of the electric motor 10 is stopped by an output from the photosensor 38. Thus, through this process, the carriage 7 is moved a distance corresponding to the thickness t of the filter plate 1 in the direction indicated by the arrow A7. At the same time, an output from the photosensor 38 causes the brake means or stoppers 41 and 42, which are provided in the carriage 7, to operate, thereby braking the movement of the carriage 7.

As shown in FIGS. 5 to 8, the filter plate comprises a frame body 43, which is square and hollow and which surrounds a partition 44. Provided on either side of the partition 44 are a group of parallel support rods 45. A porous plate 46 is provided on each group of parallel support rods. Provided on either side of the frame body 43 is a packing 47, on either side of which is provided a filter cloth 48. A sludge passage 50 is formed in the respective centers of the partition 44, the parallel support rod groups 45, the porous plates 46, and the filter cloth 48. Further, provided on one of the lower sides of the frame body 43 are a filtrate-water outlet 51 and an outlet passage 52, and, provided inside the outlet 51 is a slide valve 53, which is connected to a like rod 54. Connected to the upper end of this link rod 54 is a pressure plate 55, which is exposed outside the top portion of the hollow frame body 43. A coil spring 56 is provided between the pressure plate 55 and the upper surface of the frame body 43, thereby normally retaining the slide valve 53 in the raised position so as to keep the above-mentioned outlet 51 open. When the pressure plate 55 is pressed downwards against the resilient force of the coil spring 56, the outlet 51 is closed by the slide valve 53.

Figure 7:
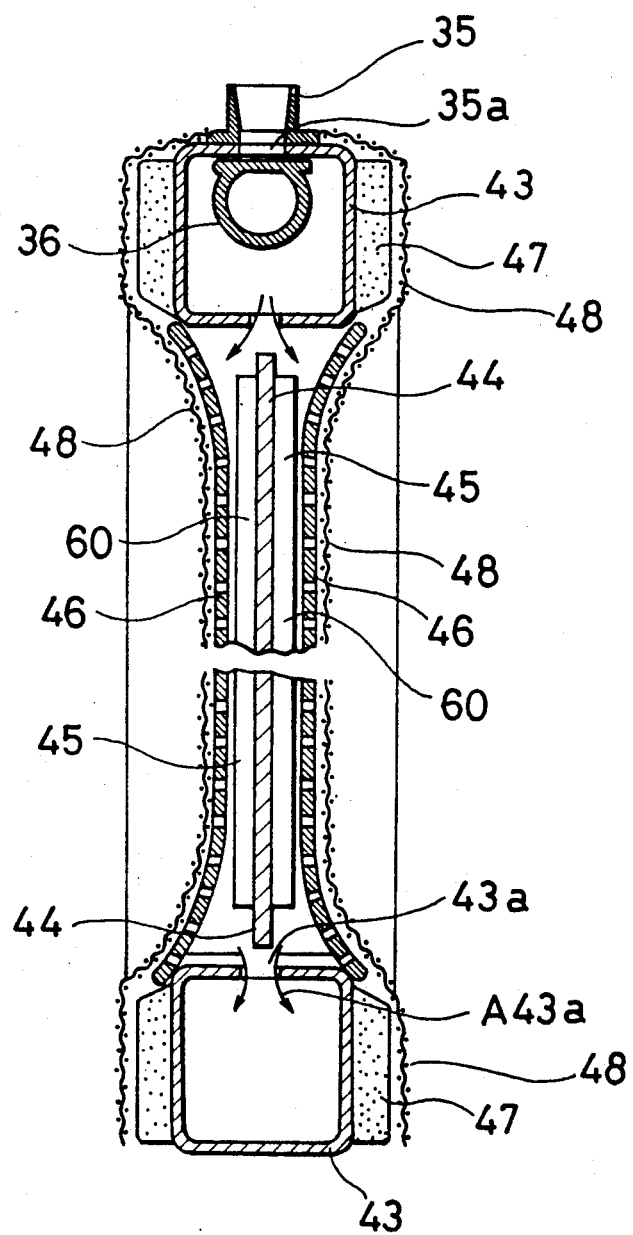
FIG. 7 is an enlarged sectional view taken along the line VII—VII of FIG. 6.
Figure 8:
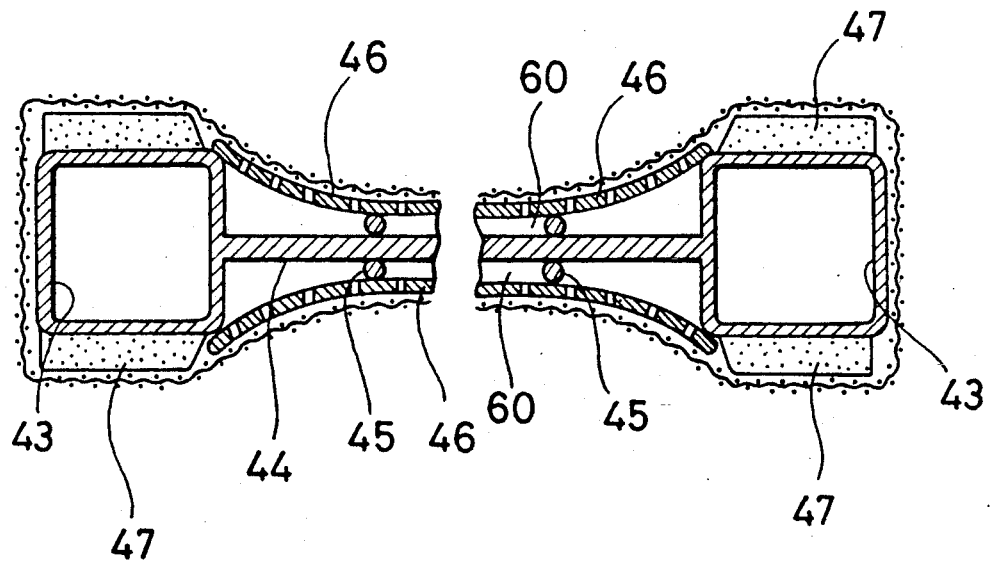
FIG. 8 is an enlarged sectional view taken along the line VIII—VIII of FIG. 6.

Further, as shown in FIG. 7, provided in the upper section of the frame body 43 is a check valve 36, which serves to open and close a communicating hole 35a leading to the connection pipe 35.

Next, to be described will be the process of removing cake 61 from the surfaces of the filter plates 1 by means of the filter press of this invention. The cake 61 is peeled from the surfaces of the filter plates 1 by separating two adjacent filter plates 1 from each other by a distance C. Also to be described will be the process of washing the filter cloth 48 on the surface of each filter plate 1 with water.

Figure 5:
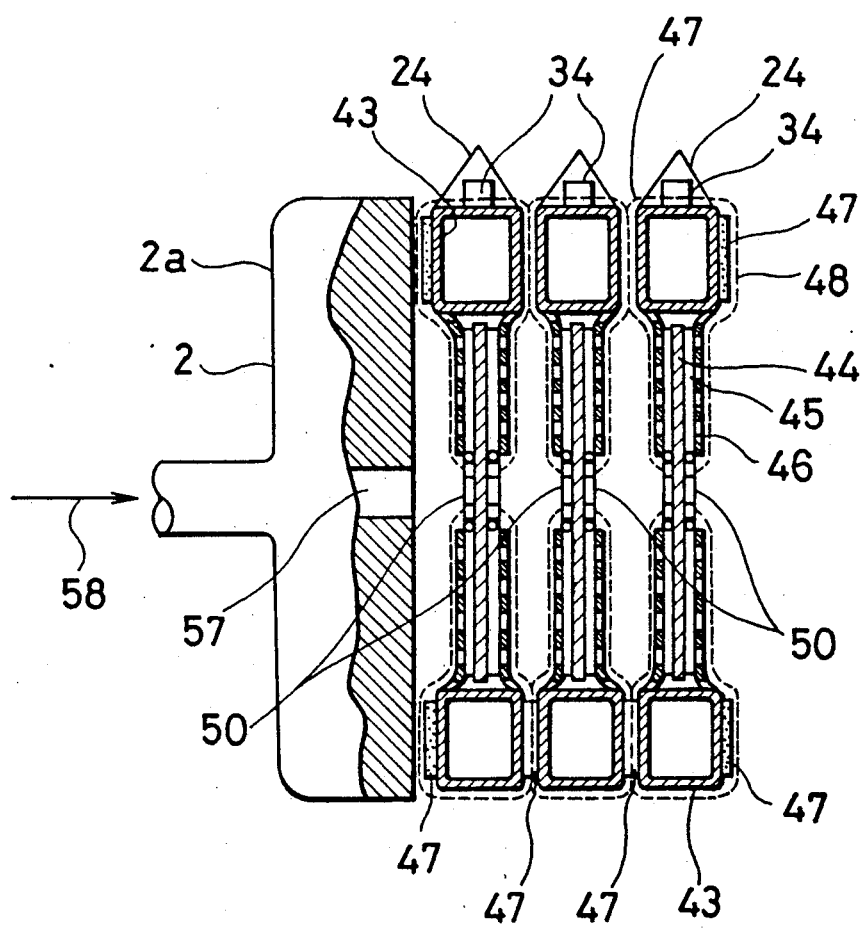
FIG. 5 is a detailed sectional view showing a part of FIG. 1.
Figure 6:
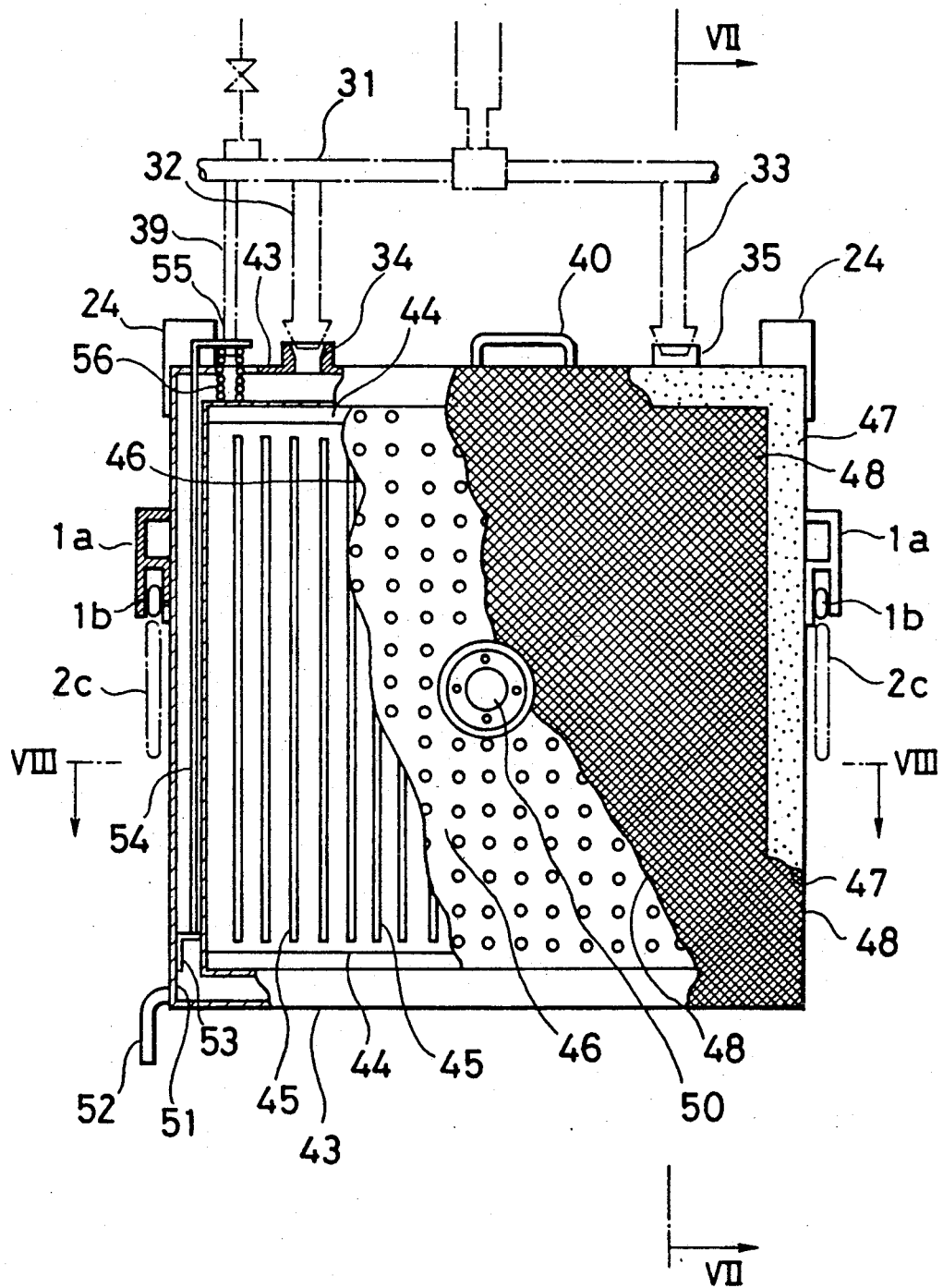
FIG. 6 is a detailed sectional view showing a part of FIG. 3.

As shown in FIG. 1, a plurality of filter plates 1 are lodged in the frame 2, which is installed on a floor 1d, in an arrangement in which they are set on edge and face each other. These filter plates 1 are arranged between one of the end surface 2a of the frame 2 and the pressure plate 3. A hydraulic apparatus (not shown) presses the pressure plate 3 in the direction indicated by the arrow A59 through the intermediation of a link rod 59, bringing the filter plates 1 into close contact with each other through the intermediation of the respective packings 47 provided on each filter plate 1, as shown in FIG. 5.

Figure 2:
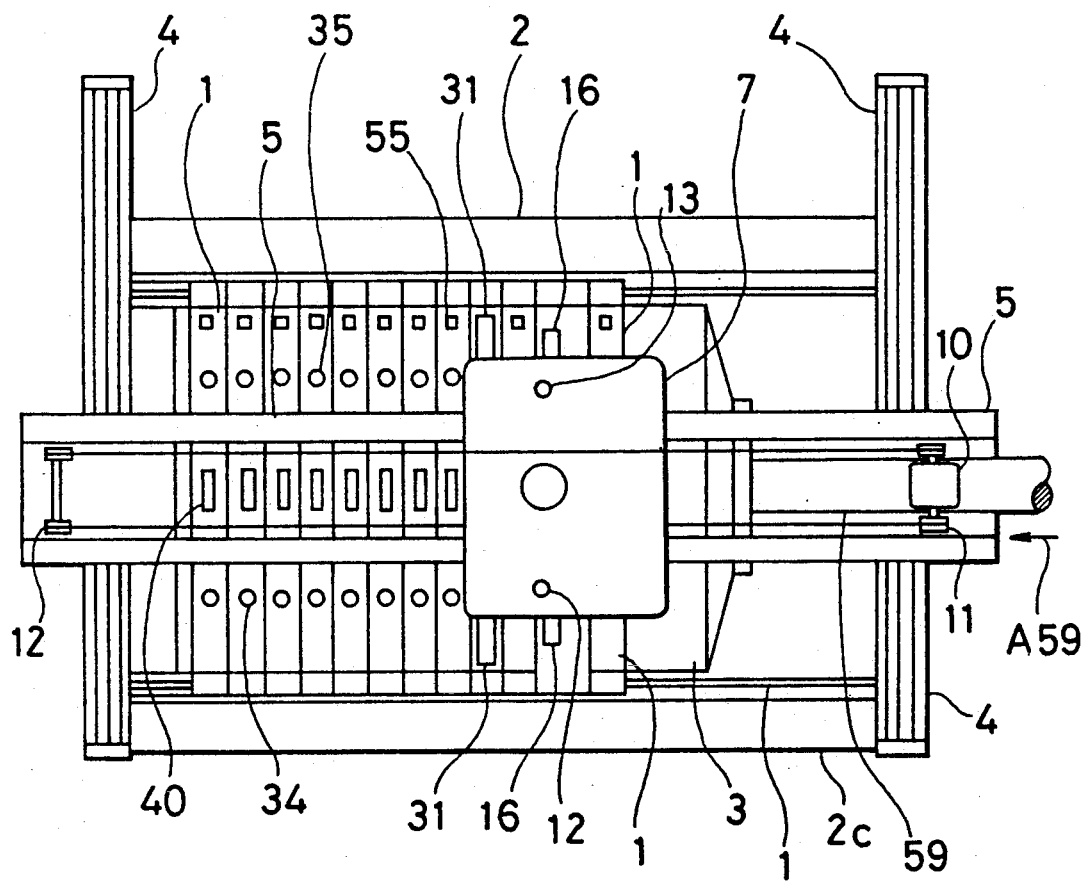
FIG. 2 is a plan view of the same.

As shown in FIGS. 2 to 4, the filter plates 1 can freely move upon filter-plate rails 2c formed in the frame 2 by means of brackets 1a and rollers 1b provided on either side of each of the filter plates 1.

In this condition, sludge 58 of the above-mentioned cement is passed through the inlet 57 provided in the end surface 2a of the frame 2 and through the respective passages 50 provided in the respective centers of the filter plates 1. The spaces between the filer plates 1 are thereby filled with sludge 58. The water contained in the sludge 58 is filtered out as the sludge is passed through the filter cloth 48 and the porous plates 46 of each filter plate, and the cement and the very fine sand in the sludge 58 gradually accumulates on the surface of each filter cloth 48, forming a layer of cake 61 thereon. The water filtered out inside each filter plate 1 flows downwards through small gaps 60 formed between the partition 44, the support rods 45, and the porous plates 46, and drops into the lower section of the hollow frame body 43 to be discharged through the outlet 51 and the outlet passage 52 provided at one end of this lower section.

When the thickness of the cake layer on the surface of each filter cloth 48 has attained a certain level, the cake layer acts as a resistance to the filtration, thereby lowering the filtering efficiency. Thus, when the thickness of the cake layer has reached a predetermined value, which is around 25 mm, the introduction of sludge through the above-mentioned inlet 57 is stopped, and the pressure plate 3 is moved in the direction reverse to that indicated by the arrow A59. The motor 10 is then driven to bring the carriage 7 first to a position above the pressure plate 3. Then, the carriage 7 is caused to travel in the direction indicated by the arrow A7. When the carriage 7 has reached the position above the handle 40 provided in the upper section of filter plate 1 at the right-most end (as seen in FIG. 1), the position of that handle 40 is supplied as input data to the photosensor 38 that is provided below the carriage 7. The data on the position of the handle 40 is then output to stop the rotation of the motor 10, and, at the same time, to cause the stoppers 41 and 42 to operate, thereby stopping the travel of the carriage 7. Subsequently, compressed air is supplied into the separating operation cylinder 18 so as to expand the link rod 19 thereof. This expansion causes the rotating rod 20 to rotate along with the water-flow pipe 16 and the separating rod 21, which are fixed thereto, around the axis 16c of the water-flow pipe 16, thereby causing the tip 22 of the separating rod 21 to displace the pointed filter-plate engagement section 24, which is positioned in the locus of rotation 23 of the tip 22, and, consequently, the associated filter plate 1 integrally formed with the engagement section, in the direction of the rotation, thereby separating the filter plate 1 from the next one by a distance C.

In this process, part of the compressed air is supplied into the operation cylinder 11 so as to slightly lower the operation rod 14, thereby enabling the distance C to be reliably obtained.

In this condition, compressed air is supplied into the reverse-washing operation cylinder 27 so as to expand the same, thereby lowering the reverse-washing water-supply pipe 31 along with the connection pipes 32 and 33. This causes the connection pipes 32 and 33 to communicate with the corresponding connection pipes 34 and 35, respectively, which are provided on the filter plate 1. At the same time, the pressing rod 39 connected to the reverse-washing water-supply pipe 31 presses the pressure plate 55 downwards against the resilient force of the coil spring 56, thereby causing the slide valve 53 to close the outlet 51. Then, compressed air 63 is introduced under pressure into the filter plate 1 via the inlet 31a of the reverse-washing is discharged from the inside to the outside of each filter cloth 48, thereby causing the cake 61 on the surface of the filter cloth 48 to be peeled therefrom and fall off. Afterwards, the operation of the stoppers 41 and 42 is cancelled, and the carriage 7 is allowed to travel in the direction indicated by the arrow A7 until the photosensor 38 thereof comes to the position above the handle 40 of the next filter plate 1. Afterwards, the above-described operation is repeated for each of the filter plates 1, thereby peeling the cake layers 61 one by one from them.

When this peeling operation has been completed, the above-mentioned pressure plate 3 is again pressed in the direction indicated by the arrow A59. Sludge 58 is then introduced under pressure into the filter plates 1 and so as to remove water from the sludge 58, this dewatering operation being repeated afterwards.

When, as a result of repeating the dewatering operation several times, the amount of dirt on each filter cloth 48 has increased or the filter cloth 48 has become clogged with dirt, the filter cloth has to be washed.

In this case, each filter plate 1 is separated from the next one by the distance C through the above-described operation. In this condition, air under pressure is supplied into the vertical operation cylinder 11 so as to cause the operation rod 14 to make a telescopic movement, which causes the guide rods 12 and 13 as well as the above-mentioned water-flow pipe 16 to move vertically within the range between the respective upper and lower sections of two adjacent filter plates 1 that are separated from each other by the distance C. After performing this vertical movement, the guide rods 12 and 13 and the above-mentioned water-flow pipe 16 are returned to the position shown in FIG. 1.

Meanwhile, the water-flow pipe 16 is connected to a water-supply device such as a water-supply pipe (not shown), and the water supplied is sprayed through the nozzles 26 on the outer surface of the respective filter cloth 48 of the two adjacent filter plates 1, thereby washing away any remnant of the cake 61 thereon.

Afterwards, air under pressure is supplied into the separating operation cylinder 18 so as to contract the link rod 19, thereby rotating the water-flow pipe 16 around the axis 16c thereof through the intermediation of the rotating rod 20 in the direction reverse to that indicated by the arrow A16. This causes the tip 22 of the separating rod 21, which is fixed thereto, to rotate so as to be returned to the original position along the locus of rotation 23.

In this condition, the braking of the above-mentioned stoppers 41 is cancelled and the motor 10 is driven again so as to move the carriage 7 in the direction indicated by the arrow A7. When the position of the handle 40 of the next filter plate 1 has been ascertained by means of the photosensor 38, the same operation as described above is repeated.

When the filter-cloth cleaning from the outside has been performed for all of the filters 1, which are arranged on edge and facing each other, the carriage 7 is returned to the original position, and is then moved again in the direction indicated by the arrow A7 until the position of the handle 40 of the filter plate 1 is ascertained by means of the above-mentioned photosensor 38. Unlike in the previous case, the separating operation cylinder 18 is not expanded this time. Instead, air under pressure is supplied into the reverse-washing operation cylinder 27 so as to expand the same, thereby lowering the reverse-washing water-supply thereof, so as to cause it to communicate with the connection pipes 34 and 35 of the filter plate 1 positioned below. At the same time, the pressure rod 39 connected to this reverse-washing water-supply pipe 31 presses the pressure plate 55 at the top of the link rod 54 against the resilient force of the coil spring 56, thereby causing the slide valve 53 to close the outlet 51.

Afterwards, instead of the above-mentioned air under pressure 63, water under pressure 62 is supplied under pressure via the inlet 31a of the reverse-washing water-supply pipe 31 to the inside of the above-mentioned filter plate 1.

The water under pressure 62 thus supplied under pressure to the inside of the filter plate 1 flows through the inner space of the hollow frame body 43 and enters the space defined by the porous plates 46. The water then flows from the inside to the outside through the porous plate 46 and the filter cloth 48 positioned outside the porous plates 46 so as to outwardly push off the cake clogging the filter cloth 48, thus washing away the clogging cake.

When the filter cloth 48 of the filter plate 1 has been thus washed from the inside, the above-mentioned reverse-washing water-supply pipe 31 is raised to the original position, and the outlet 51 of the hollow frame body 43 is filter plate 1 to the exterior therethrough. Afterwards, the braking of the stoppers 41 and 42 is cancelled again so as to allow the carriage 7 to move in the direction indicated by the arrow A7 for the purpose of performing reverse-washing on the next filter plate 1. By repeating this process, all the filter plates 1 can be reverse-washed.

What is claimed is:

1. A press comprising:
   a plurality of filter plates having two spaced faces separated by an edge;
   a frame for supporting said plurality of filter plates, said faces being oriented vertically and facing each other;
   a stationary plate at one end of said frame;
   a pressure plate slidably arranged at the other end of said frame;
   a horizontal track above said frame;
   a carriage movable along said horizontal track;
   a vertical operation cylinder supported on said carriage and having an operating rod;
   a reverse-washing operation cylinder supported on said carriage and having a link rod;
   a photosensor supported on said carriage;
   a water-flow pipe having an axis and nozzles for outward washing, said water-flow pipe being supported for rotation relative to said operating rod;

a separating operation cylinder having a link rod, said separating operation cylinder being supported on said operating rod;

a separating rod connected to the lower end of the link rod of said separating operation cylinder and supported for pivoting around the water-flow pipe axis;

a reverse-washing water-supply pipe connected to the lower end of the link rod of said reverse-washing operation cylinder;

connection pipes protruding from said reverse-washing water-supply pipe to respectively face corresponding connectors on the end of a selected one of said filter plates; and means for selectively supplying said reverse-washing water-supply pipe with air under pressure or water under pressure.

2. A press as claimed in claim 1, wherein said horizontal track is supported for movement along a pair of horizontal crossing rails disposed perpendicular to the direction in which said filter plates are arranged.

3. A press as claimed in claim 1, further comprising brake means located between said horizontal tracks and said carriage for braking said carriage.

4. A press as claimed in claim 1, wherein said photosensor is attached to the link rod of said reverse-washing operation cylinder.

5. A press comprising:

a plurality of filer plates having two spaced faces separated by an edge;

a frame for supporting said plurality of filter plates, said faces being oriented vertically and facing each other;

a stationary plate at one end of said frame;

a pressure plate slidably arranged at the other end of said frame;

a horizontal track above said frame;

a carriage movable along said horizontal track;

a vertical operation cylinder supported on said carriage and having an operating rod;

a reverse-washing operation cylinder supported on said carriage and having a link rod;

a photosensor supported on said carriage;

brake means for stopping said carriage at selected positions along said horizontal track;

guide rods supported for vertical movement with respect to said carriage;

a driving rod rigidly connected to said guide rods and the operating rod of said vertical operation cylinder;

a water-flow pipe having an axis and nozzles for washing said filter plates from the outside, said water-flow pipe being supported for rotation relative to said driving rod;

a separating operation cylinder having a generally vertically oriented link rod, said separating operation cylinder being supported on said driving rod;

a separating rod connected to the lower end of the link rod of said separating operation cylinder and supported for pivoting around the axis of said water-flow pipe in response to movement of the link rod of the separation operation cylinder;

a reverse-washing water-supply pipe connected to the lower end of the link rod of said reverse-washing operational cylinder;

connection pipes protruding from said reverse-washing water-supply pipe to respectively face corresponding connectors on the edges of a selected one of said filter plates;

means for selectively supplying said reverse-washing water-supply pipe with air under pressure or water under pressure; and guide rods connected to said reverse-washing water-supply pipe and supported for vertical movement with respect to said carriage.

6. A press comprising:

a plurality of filter plates having two spaced faces separated by an edge;

a frame for supporting said plurality of filter plates between a stationary plate and a pressure plate, said faces being oriented vertically and facing each other;

a horizontal track above said frame;

a carriage movable along said horizontal track;

a vertical operation cylinder supported on said carriage and having an operating rod;

a water-flow pipe having an axis and nozzles for outward washing, said water-flow pipe being supported on said operating rod for rotation about its axis;

a separating rod supported for pivoting around the water-flow pipe axis;

means for pivoting said separation rod to selectively separate one filter plate from another;

a reverse-washing pipe supported on said carriage and including a connection pipe protruding therefrom;

means for selectively locating said connection pipe to face a corresponding connector on a selected one of said filter plates; and means for selectively supplying said reverse-washing pipe with air under pressure or water under pressure.

7. The filter of claim 6, further comprising a sensor for detecting a filter plate and means for controlling said locating means to control movement of said carriage in response to a signal from said sensor.

8. The filter of claim 6, wherein said pivoting means comprises:

a rotatable rod fixed for rotation with said separating rod;

a separating operation cylinder supported on said operating rod, said separating operation cylinder operating a drive link connected to rotatably drive said rotatable rod.

9. The filter of claim 6, wherein said locating means comprises a reverse-washing operation cylinder supported on said carriage and supporting said reverse-washing pipe, said reverse-washing operation cylinder being operable to selectively raise said reverse-washing pipe and said connection pipe clear of the selected filter plate connector and lower reverse-washing pipe and said connection pipe into facing relationship with the selected filter plate connector.

* * * * *